Dec. 3, 1957   R. J. HAUG   2,815,050
ANGULAR POWER TRANSMISSION TUBE
Filed Aug. 22, 1956
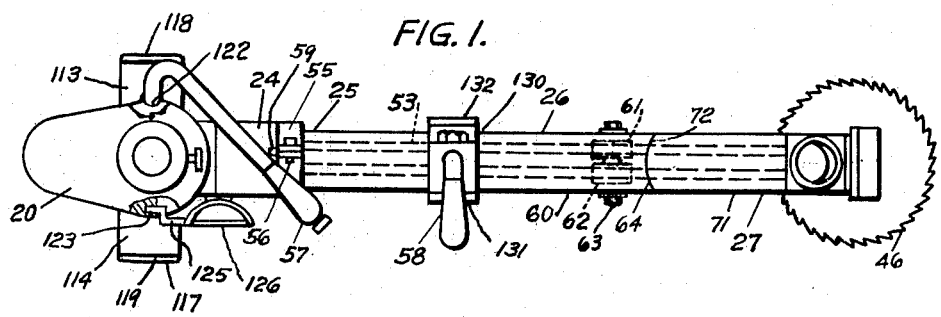
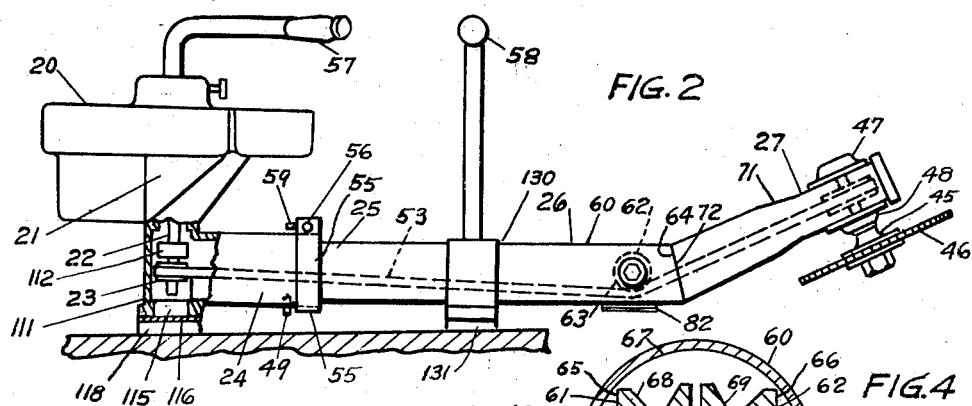
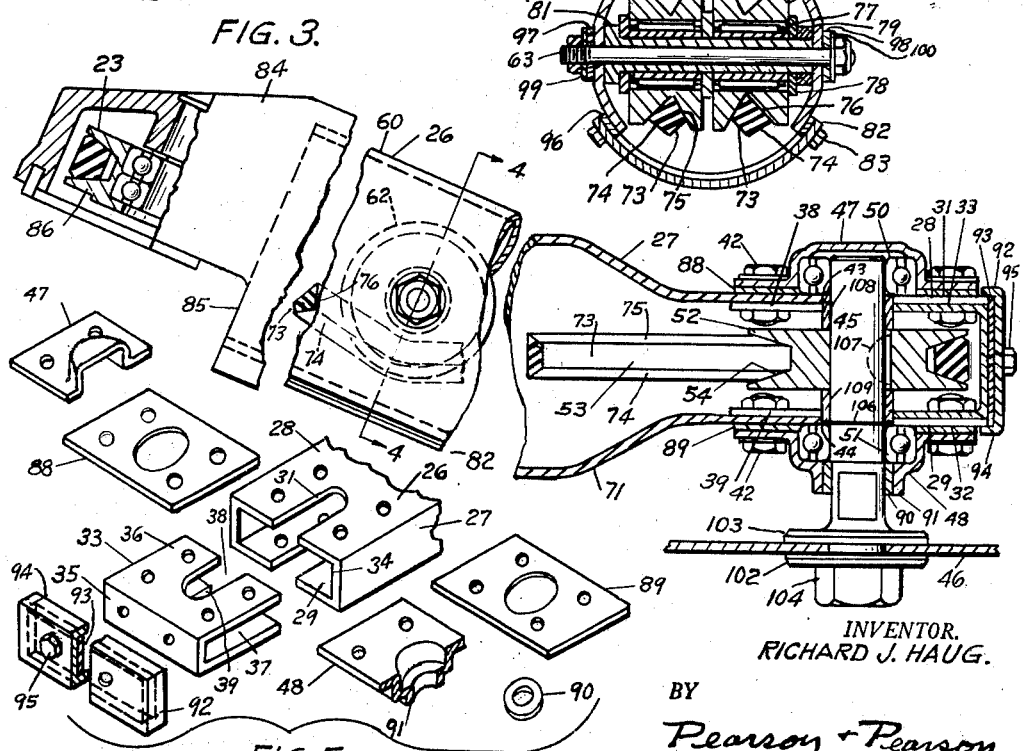
INVENTOR.
RICHARD J. HAUG.
BY
Pearson + Pearson
ATTORNEYS.

United States Patent Office 2,815,050
Patented Dec. 3, 1957

2,815,050

ANGULAR POWER TRANSMISSION TUBE

Richard J. Haug, Nashua, N. H.

Application August 22, 1956, Serial No. 605,576

12 Claims. (Cl. 143—43)

This invention relates to portable tools of the type in which a light weight engine is suspended on, or carried by, the operator and a tool is powered therefrom by a tubular power transmitting member.

In U. S. Patent No. 2,725,753, issued to me on December 6, 1955, the tubular power transmitting member is knee jointed and the engine is back carried. In this invention the engine is preferably carried in front of the operator and the axis of the tubular power transmitting member is fixed relative to the engine.

The principal object of the invention is to provide a simplified, low cost, tubular power transmitting member and portable engine wherein the member is capable of rotation part way around its own axis, but other movement of the driven element is accomplished by moving the entire engine and tube as a unit.

Another object of the invention is to provide an improved tubular power transmitting member for supporting and powering a driven element such as a circular saw in which the saw arbor is mounted on a single tubular member turnable in a socket of an engine, thereby reducing weight and cost.

A further object of the invention is to provide a tubular support for a circular saw, which support is angularly bent to offset a considerable portion of the end thereof, thereby raising the circular saw from the ground when the tool is at rest and permitting a low horizontal cut when the support is angled downwardly toward the base of a tree or bush.

Still another object of the invention is to provide an angular belt and pulley power transmission tube wherein the intermediate guide pulleys are grooved to receive the normally exterior faces of a V-belt in their naturally twisted position caused by the angle in said tube to prevent displacement of the belt from the grooves.

In the drawing,

Fig. 1 is a plan view of a portable tool incorporating my invention, with parts broken away.

Fig. 2 is a side elevation thereof, partly broken away.

Fig. 3 is an enlarged, fragmentary side sectional view of the angularly bent tube of the invention but showing how the tube fits a knee joint head socket as well as an engine casing socket.

Fig. 4 is a view in section on line 4—4 of Fig. 3, and

Fig. 5 is an exploded view of the sealing means for making the power transmitting tube, or housing, watertight.

As shown in the drawing, 20 is a light weight, internal combustion engine having an engine casing 21, a vertical drive shaft 22 and a horizontal drive pulley 23. Engine 20 is provided with a cylindrical socket 24, integral with a detachable pulley housing 111, mounted below engine casing 21 and connecting with drive pulley 23 whereby the drive pulley is centered at the base of the socket. Socket 24 is arranged to slideably and rotatably receive the inner end 25 of a power transmitting tube 26 whereby the tube may be twisted or rotated around its central longitudinal axis while supported therein.

The tube 26 is elongated, hollow, and/or rigid, self supporting material such as metal. It is of circular cross section at least at the inner end 25 but is flattened at the outer end 27 to a rectangular cross section. The flat upper wall 28 and the flat lower wall 29 of the terminal outer end 27 of tube 26 are each provided with a U-shaped slot 31 and 32 respectively, each slot extending inwardly from the terminal edge thereof and located opposite the other. A cap 33 preferably of U shape, is provided for the terminal opening 34 of tube 26, the cap having a rectangular end wall 35, an upper wall 36, a lower wall 37 and a U-shaped slot 38 or 39 in each of said walls 36 and 37. The slots 38 and 39 are located opposite each other and extend outwardly from the terminal edges of cap 33. When cap 33 is fixed in place within the outer end 27 of tube 26 by bolts 42, the slots 31 and 38 and the slots 32 and 39 mutually define a pair of opposite, circular apertures 43 and 44 arranged to receive a driven shaft 45 forming the tool arbor of the driven element such as the circular saw 46.

A pair of dished housings 47 and 48 are provided for an upper bearing 50 and a lower bearing 51, the housings being conveniently attached to the outer end 27 by the bolts 42. The shaft 45 is rotatably mounted in bearings 50 and 51 and carries a grooved driven pulley 52 closely fitting the interior of the flattened compartment formed by the outer end 27 of tube 25, thereby preventing the belt 53 from being displaced out of the groove 54. The belt 53 is preferably a V-type belt and is trained around driven pulley 52 and drive pulley 23 to thereby power the driven element such as circular saw 46. A collar 55 having a set screw 56 is carried on the exterior of tube 26 whereby the belt 53 holds the parts together at the tension secured by longitudinal positioning of the collar. The collar abuts on the forward edge of socket 24. An L-shaped hand grip 57 extends upwardly from engine 20 and another L-shaped hand grip 58 extends upwardly from about midway of tube 26 whereby the portable tool is manipulable in the hands of an operator. Because of the rotatable connection of the inner end 25 in cylindrical socket 24, the tube 26 and saw 46 may be twisted by hand grip 58 around the longitudinal axis of the tube, thereby twisting belt 53 a quarter twist in either angular direction. An arcuate projection 49 on the socket 24 and a cooperating lug 59 on the collar 55 serve as limit stops to prevent excess twisting.

The tube 26 is angular rather than straight. As shown, the tube 26 is formed with a main section 60 having a pair of V-grooved guide pulleys 61 and 62 freely rotatable in a plane at right angles to the plane of drive pulley 23 on a single lateral shaft 63 proximate the outer end 64 of the main section. As best shown in Fig. 4, the outer peripheries 65 and 66 of the pulleys 61 and 62 may be closely spaced to the interior wall 67 of the main section 60 for maintaining the belt 53 in the grooves 68 and 69 of the guide pulleys and eliminating any possibility of accidental displacement. Tube 26 is also formed with an extension section 71 having its inner end 72 fixed at an acute upward angle to the outer end 64 of main section 60. The two parallel stretches of belt 53 thus extend along the middle plane of extension 71 and under the guide pulleys 61 and 62 well below the middle plane of main section 60. V-belt 53 is of quadrangular cross section whereby the bottom and side faces 73, 74 and 75 are received within groove 54 of pulley 52 while the top face 76 and one of the side faces 74 or 75 is received in each of the grooves 68 or 69 of the guide pulleys 61 or 62. Needle bearings such as at 77, washers 78, spacers 79 and a shaft tube 81 are provided for the pulleys 61 and 62, together with a removable cover 82 attachable to main section 60 by bolts 83. The two stretches of belt 53 are shown in cross section in Fig. 4, in their natural position of twist, at rest and without tension, when the belt is bent upward to encircle pulley 52. The V grooves 68 and 69 conform to this natural twist position to enable the belt to operate without undue wear or jumping from the grooves.

As shown in Fig. 3 the tube 26 not only is usable with the portable tool shown in Figs. 1 and 2 but may also be slideably and rotatably mounted in a knee joint head 84 of a knee jointed tubular handle such as shown in my prior U. S. Patent 2,725,753 of December 6, 1955. Such knee joint heads include a cylindrical socket 85 corresponding to socket 24 and a drive pulley 86 centered at the base of the socket similar to drive pulley 23.

Preferably the tube 26 includes means for water sealing the terminal outer end 27 whereby the device may be used to cut weeds or crops under water for long periods without damage. As shown in Figs. 3 and 5, flat gaskets 88 and 89 are mounted under housings 47 and 48 and an annular gasket 90 is seated between the flange 91 of housing 48 and the tool shaft 45. A second cap 92, having a gasket 93 seated within a peripheral flange 94 is mounted by screws 95 over the cap 33 at outer end 27 to thoroughly seal the opening 34 against the entrance of water. In addition, a gasket 96 is mounted under cover 82 and annular gaskets 97 and 98 are installed under the washers 99 and 100 on shaft 45.

The circular saw 46 is provided with a collar 102 and is locked on the saw arbor 103 by a nut 104. Shaft 45 is provided with a snap ring 106, a key 107 and spacers 108 and 109. Preferably the upward angle of extension 71 to the main section 60 is about 20° and the extension 71 is at least about ten inches in length whereby a saw of about ten to fifteen inches in diameter cannot touch the ground when the engine 20 is resting thereon.

As shown in Figs. 1 and 2, socket 24 is preferably integrally cast with a drive pulley housing, or head, 111 forming the lower portion of engine casing 21 and fixed thereto in any convenient manner. Pulley housing 111 contains drive pulley 23 and a centrifugal clutch 112, both being carried by shaft 22. Housing 111 also includes a pair of laterally extending, opposite, integral projections 113 and 114 and a bottom opening 115 enabling access to the clutch and pulley. A cover plate 116 of resilient material is provided, the plate 116 having downwardly and outwardly extending leg portions at 117 and 118 which are upwardly and then inwardly turned at their extremities to slide in grooves as at 119 in the projections 113 and 114. The cover plate 116 thus forms laterally spaced legs with a raised portion intermediate thereof, the raised portion covering the opening 115 and both cover and legs being slideable to expose the opening 115. Pulley housing 111 also includes an integral socket 122 for slideably receiving the handle grip 57 and integral sockets such as at 123 for slideably receiving a yieldable leg brace 125, all of the sockets having suitable set screws. Leg brace 125 is of relatively rigid material such as metal wire and is bent into U shape with a yieldable or resilient strap 126 extending between the legs of the U. The leg of an operator may thus engage the strap 126 during operation of the tool.

Handle grip 58 on tube 26 is preferably clamped therearound as at 130 and provided with a pair of downwardly and laterally extending legs 131 and 132. Legs 117 and 118 together with legs 131 and 132 thus form a substantially triangular support for the device while the engine is being started thereby enabling the saw to revolve freely and preventing the saw arm from twisting into contact with the ground.

I claim:

1. A belt and pulley power transmitting tube for supporting and guiding a tool at a distance from a man-carried engine having a drive pulley at the base of a tube receiving socket, said tube comprising an elongated, hollow, rigid body of circular cross section having an inner end adapted to fit within said tube receiving socket, an acute angular bend intermediate thereof, and an outer end flattened to substantially rectangular cross section said outer end having a pair of opposite, central, U-shaped slots extending inwardly from the terminal end thereof; a U-shaped cap adapted to fit within the flattened outer end of said tube and having a pair of opposite U-shaped slots extending outwardly from the terminal end thereof, the slots in said cap and tube mutually forming opposite, circular, apertures when said cap is fixed within said tube end; a pair of bearing housings, each fixed to said tube end outside one of said circular apertures and each containing a bearing; a tool shaft mounted in said bearings and extending through said apertures, said shaft having a driven pulley within the flattened end of said tube and adapted to carry a tool outside said tube end; a flexible belt trained around said driven pulley, extending through said angularly bent tube and adapted to be trained around said drive pulley when the inner end of said tube is fitted into said socket, and a pair of guide pulleys, rotatably mounted on a shaft extending laterally within said tube proximate the angular bend therein, each adapted to embrace one of the parallel stretches of said belt in its normally twisted position caused by the bend in said tube.

2. A combination as specified in claim 1 wherein said tube is angularly bent intermediate of its length at an acute angle of at least 20° and the guide pulleys for said belt are located in advance of said bend on the side thereof, remote from said driven pulleys.

3. A combination as specified in claim 1 plus means for water sealing the flattened outer end of said tube including a second cap containing a gasket and having a peripheral flange for overlying the entire end of said tube.

4. A combination as specified in claim 1 wherein said tube is angularly bent intermediate of its length at an angle of about 20° and means are provided for sealing the outer end of said tube against the admission of water.

5. A belt and pulley power transmitting tube for supporting and guiding a tool at a distance from a man carried engine having a drive pulley at the base of a tube receiving socket, said tube comprising an elongated, hollow, rigid, tubular main section having an inner end of circular cross section adapted to be twisted around its longitudinal axis in said socket; a pair of V grooved guide pulleys freely rotatable in a plane at right angles to the plane of said drive pulley on a single lateral shaft proximate the outer end of said main section; an elongated, hollow, rigid, tubular extension section having its inner end fixed at an acute angle to the outer end of said main section; a driven pulley, rotatable in a plane inclined to the plane of said drive pulley on a driven shaft normal to the axis of said extension section proximate the outer end thereof and a flexible belt having its outer loop trained around said driven pulley, having two parallel stretches extending within and along said extension section, under said guide pulleys and within and along said main section to an inner loop adapted to be trained around said drive pulley for powering an exterior tool mounted on said driven shaft.

6. A belt and pulley power transmission device for driving a tool at a distance from a drive pulley powered by an operator-carried engine, said device comprising an elongated, hollow, tubular housing of rigid, self-supporting material having an inner end adapted to be supported proximate said horizontal drive pulley for rotation around the longitudinal axis of the housing; a pair of freely revolvable grooved guide pulleys rotatable in parallel vertical planes on a shaft extending laterally of said housing proximate the outer end thereof; an elongated, hollow, tubular housing extension of rigid self-supporting material having an inner end fixed at an acute upward angle to the outer end of said housing; a single driven pulley, rotatable in a plane inclined from the plane of said drive pulley on a driven shaft, proximate the outer end of said housing extension, and a flexible belt of quadrangular cross section trained around said driven pulley and under said guide pulleys for connecting with said drive pulley and powering said driven shaft, the grooves in said guide pulleys each fitting around an opposite outer corner of said belt when in the natural twisted position of rest caused by its being bent through said acute angle.

7. A portable, man-carried tool comprising an internal combustion engine having a vertical drive shaft with a horizontal drive pulley thereon; a pulley housing fixed below said engine to enclose said drive pulley, said housing having a tube receiving cylindrical socket connecting with said drive pulley; an elongated, angularly bent, hollow, rigid tube of circular cross section, having an inner end supported in said tube receiving socket and adapted to rotate therein around its longitudinal axis and having an outer end portion flattened to a rectangular cross section; a driven pulley carried by a pulley shaft journalled in the flattened end of said tube at the bend therein, and adapted to drive a tool exterior to said tube; a pair of V-grooved guide pulleys rotatably mounted within said tube, at the bend therein, and a flexible belt, entirely enclosed by said tube and trained around said drive pulley and driven pulley and under said guide pulleys for connecting said tool to said engine while permitting said tube and tool to be quarter twisted in either angular direction.

8. A combination as specified in claim 7 wherein said belt is of quadrilateral cross section, said driven pulley is grooved to fit around the bottom face and both side faces thereof and each said V-grooved guide pulley fits around the top face and one of the opposite side faces thereof.

9. A combination as specified in claim 7 plus a first upstanding L-shaped hand grip mounted in a handle socket on said pulley housing and a second upstanding L-shaped hand grip clamped intermediate of said tube, for carrying said portable tool.

10. A combination as specified in claim 7 plus a pair of oppositely disposed laterally extending, integral projections mounted on the bottom of said pulley housing and a cover plate having a pair of downwardly and outwardly extending legs slideably mounted on said projections.

11. A combination as specified in claim 9 wherein said second L-shaped hand grip includes a pair of opposite downwardly extending legs for supporting said tube and preventing turning thereof when on the ground.

12. A combination as specified in claim 9 plus a leg brace removably fixed in a brace socket in said pulley housing, said brace comprising a wire member bent into U shape and a yieldable strap extending between the legs of the U for cushioning said engine against the leg of an operator when carried by said hand grips.

References Cited in the file of this patent

UNITED STATES PATENTS

| | | |
|---|---|---|
| 18,151 | Jenkins | Sept. 8, 1857 |
| 160,406 | Edson et al. | Mar. 2, 1875 |
| 827,548 | Martin | July 31, 1906 |
| 2,457,511 | Ware | Dec. 28, 1948 |
| 2,497,639 | Underwood | Feb. 14, 1950 |
| 2,519,936 | Sayre | Aug. 22, 1950 |
| 2,635,649 | Brownlee | Apr. 21, 1953 |
| 2,725,753 | Haug | Dec. 6, 1955 |
| 2,765,666 | Haug | Oct. 9, 1956 |